March 13, 1928.
R. KRUMM
GAUGING DEVICE
1,662,066
Filed Nov. 22, 1926
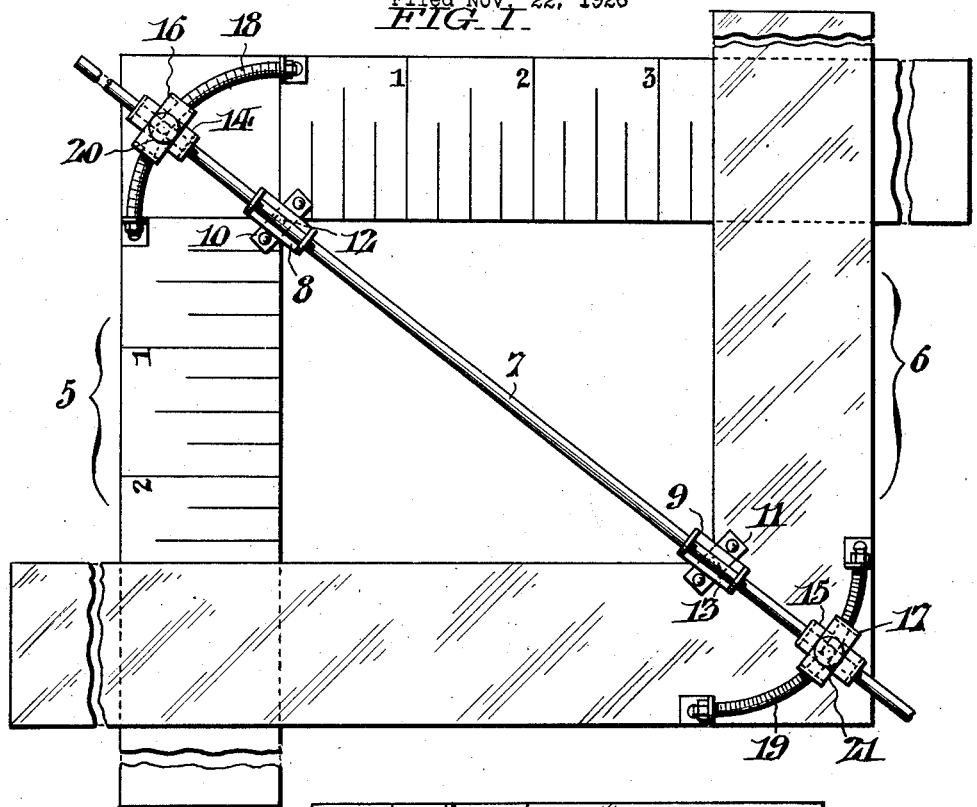
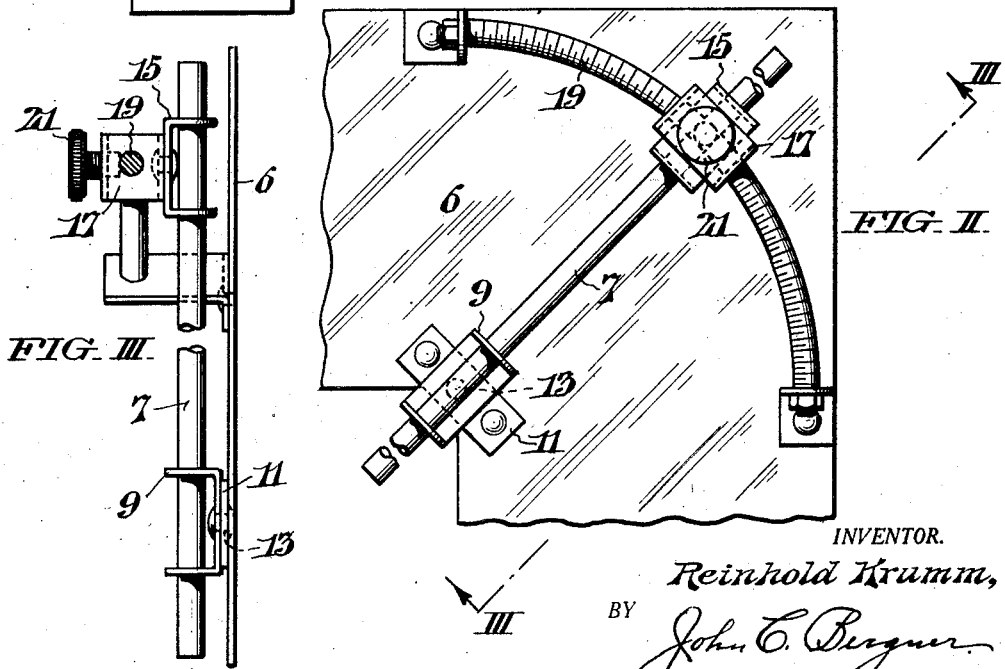
INVENTOR.
Reinhold Krumm,
BY John E. Bergner
ATTORNEY.

Patented Mar. 13, 1928.

1,662,066

UNITED STATES PATENT OFFICE.

REINHOLD KRUMM, OF PHILADELPHIA, PENNSYLVANIA.

GAUGING DEVICE.

Application filed November 22, 1926. Serial No. 150,075.

This invention relates to devices of a kind useful to photographers, artists, draftsmen, etc., in gauging and border marking photographs, pictures or charts.

In the main, my invention is directed toward provision of a device of the sort referred to having capacity for universal adjustment to define geometric areas, e. g., squares or oblongs, of different sizes incidentally to trial by superimposition of the device upon a photograph, picture or chart in determining the configuration and proportions best suited to the subject or any part thereof,—for the purposes of subsequent border marking, cutting or blocking out.

A further object of my invention is to secure the above desiderata in a gauging device that is extremely simple in construction, very easy to manipulate, and conducive to manufacture at comparatively small cost.

Other objects and attendant advantages will become readily apparent from the detailed description hereinafter of the typical embodiment of my invention shown in the accompanying drawings whereof Fig. I is a plan view of the device;

Fig. II is a fragmentary view of the same on a larger scale than in the preceding illustration; and Fig. III, a view taken as indicated by the arrows III—III in Fig. II.

As herein delineated, the device comprises a pair of opposing overlapping members 5—6 which, in the present instance, are right-angled,—one of them having both its extremities graduated for a purpose later on explained. These members 5—6 may be either of sheet metal, wood or celluloid, and are joined by a diagonal connecting rod 7 that has its opposite ends frictionally engaged in upstanding apertured ears of swivel pieces 8—9 respectively pivoted to bearing plates 10—11 on axes 12—13 directly in line with the vertices of the interior angles of said members. Beyond the parts just described, the rod 7 is further engaged, with capacity for endwise shifting, in clips 14—15 which are pivotally coordinated with slides 16—17 movable along accurate segmental guides 18—19 at the corners of the angle members 5—6, the curvature of said guides being concentric with respect to the swivel axes 12—13. Angular adjustments of the rod 7 relative to the angle members 5—6 or vice versa are fixable by thumb screws 20—21 which are carried by the slides 16—17 and bind against the segmental guides 18—19. If desired or required, the segmental guides 18—19 may be graduated in circular degrees to facilitate such angular adjustments.

In use, the device is superimposed upon the photograph, picture or chart—as the case may be—so that the part or section to be used or preferred is visible in the opening between the angle members 5—6. Then, by loosening the thumb screws 20—21, the angle members 5—6 may be swung about their respective swivel pivots 12—13 and at the same time moved toward or away from each other to reduce or enlarge the intervening exposure opening and change its shape from oblong to square or vice versa. In this way it is obviously possible by trial, to determine the proportions and configuration best adapted to the particular subject at hand as well as to secure proper balance and symmetry of details. In proceeding as explained, care must be exercised to insure that the exposure opening forms a perfect parallelogram. It is for this reason that the graduations are provided on the angle member 5. After the desired setting is obtained, the thumb screws 20—21 are tightened to prevent relative displacement as between the angle members 5—6 incidentally to subsequent further use of the device for border marking or cutting.

It is of course to be understood that the members 5—6 may be given a configuration other than that herein shown and described,—this consideration being governed entirely in accordance with requirements of actual use and application.

Having thus described my invention, I claim:

1. A gauging device of the character described comprising opposing overlapping members enclosing an intervening exposure area, fittings having swivel connection with said members and a connecting rod slidably engaged in the fittings whereby the members may be moved toward or away from one another and relatively swung in varying the configuration and size of the exposure area.

2. A gauging device of the character described comprising opposing overlapping angle members enclosing an intervening exposure area, fittings having swivel connection with the members at the angle vertices, and a connecting rod slidable in the fittings whereby said members may be moved toward or away from one another and swung relatively in determining parallelogram exposure areas of different sizes and proportions.

3. A gauging device of the character described comprising opposing angle members enclosing an intervening exposure area, fittings having swivel connection with the members at the angle vertices, a connecting rod slidable in the fittings whereby said members may be moved toward or away from one another and swung relatively in determining parallelogram exposure areas of different sizes and proportions, and means to secure the parts in adjusted positions.

4. A gauging device of the character described comprising opposing overlapping angle members enclosing an intervening exposure area, fittings having swivel connection with the members at the angle vertices, a connecting rod slidable in the fittings whereby said members may be moved toward or away from one another and swung relatively in determining parallelogram exposure areas of different sizes and proportions, arcuate guides on the members concentric with the swivel centers, and cooperative means on said connecting rod for clampingly engaging the arcuate guides to secure the parts in adjusted positions.

In testimony whereof I affix my signature.

REINHOLD KRUMM.